Sept. 8, 1959     R. A. SCHAEFER     2,902,748
BEARING AND METHOD OF MAKING SAME
Filed Jan. 9, 1956     2 Sheets-Sheet 1
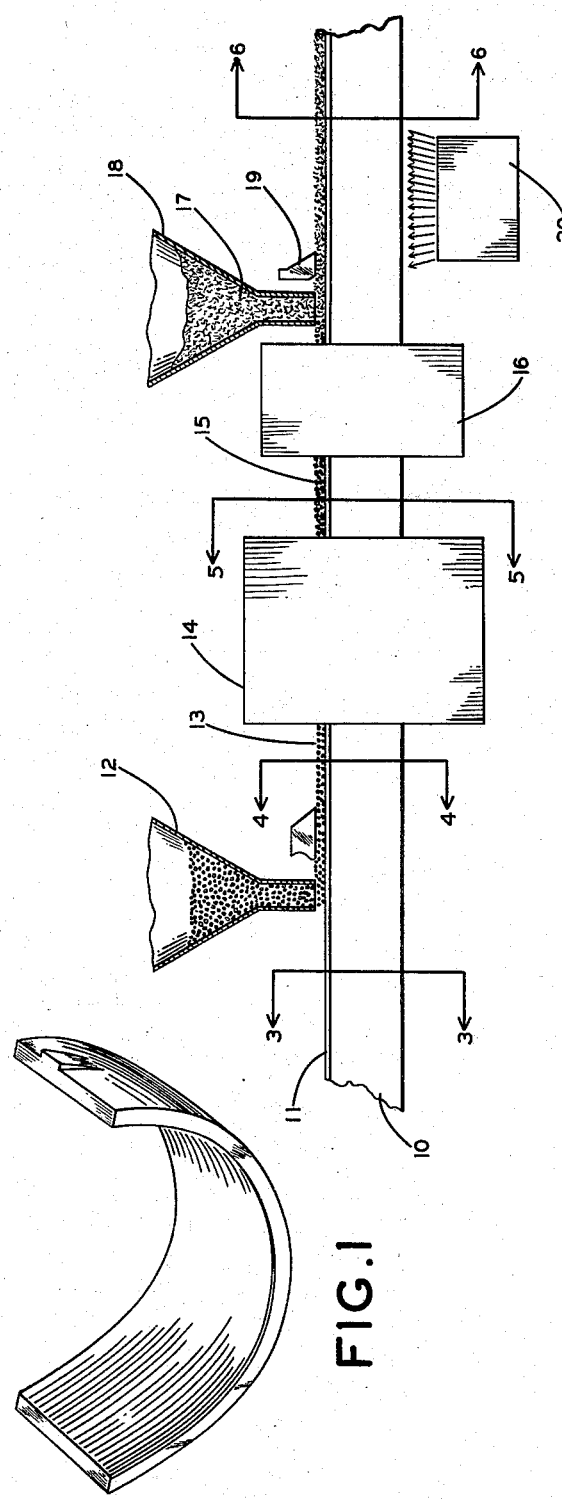
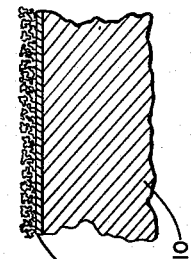
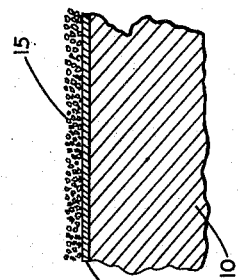
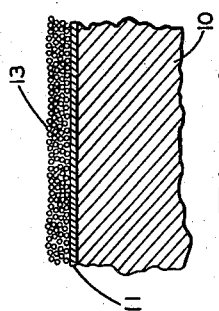
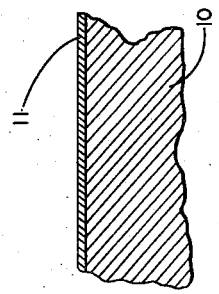
INVENTOR.
RALPH A. SCHAEFER
BY
*Eber J. Hyde*
ATTORNEY United States Patent Office 2,902,748
Patented Sept. 8, 1959

2,902,748

BEARING AND METHOD OF MAKING SAME

Ralph A. Schaefer, Cleveland, Ohio, assignor to Clevite Corporation, Cleveland, Ohio, a corporation of Ohio Application January 9, 1956, Serial No. 558,003

4 Claims. (Cl. 29—149.5)

This invention pertains to bearings, and more particularly to sleeve bearings such as are used in automobiles, trucks, etc., and to the strip material from which the bearings are formed.

Automobile bearings usually consist of a hard metal backing member such as steel to which is adhered a layer of a bearing material such as babbitt, leaded-bronze, copper-lead or the like. These bearings must be able to withstand high loading, high speeds and they must be resistant to fatigue alone and with corrosive conditions. The bearings also must be resistant to suspended dirt carried in the lubricating oil, in the air, and in the fuel systems. Further, bearings must have a low coefficient of friction, and they should give minimum scoring to the crankshaft. In addition to all of these physical qualities they should be inexpensive.

Inexpensive babbitt lined strip cast bearings are available but as the automotive trend toward higher bearing loading continues they are becoming marginal. Excellent bearings formed of copper-lead with an overlay plate of lead-tin-copper are available to withstand the higher loads but at substantially increased costs because both casting and plating processes are involved in their production.

An object of the present invention is to provide a strip of bearing material, and the method of making same, from which low cost, high quality bearings can be made.

It is an object of the present invention to provide an intermediate bearing, that is one which approaches the cost of the bimetal type bearing and which has qualities approaching the more expensive trimetal type bearing.

Another object of the invention is to provide a bearing which gives higher duty performance than bimetal babbitt bearings, and which is made by a continuous process.

For a better understanding of the present invention, together with other and further objects thereof, reference is had to the following description taken in connection with the accompanying drawings, and its scope will be pointed out in the appended claims.

An aspect of the present invention is the provision of a bearing which is made of a layer of strong metal which serves as a backing member, and adhered to one face thereof is a sintered sponge layer of copper-tin bearing material having cavities predominantly on the order of about .001" in size, with the cavities substantially all filled by babbitt.

Another aspect of the invention is the method of producing a strip of bearing material wherein there is spread on the upper face of a steel strip a layer of powdered metal comprising at least in part copper-tin alloy of particle size such that all particles pass 150 mesh and approximately 50% pass 325 mesh. This layer is gravity sintered at approximately 1900° F. without mechanical compacting to form a sponge layer having about ⅔ of its volume metal and about ⅓ cavities which are predominantly on the order of about .0015". The temperature of the sintered strip is brought to about 1000 to 1200° F., either by heating or by cooling, and then babbitt at a temperature of about 700° F. is cast thereon. This composite layer is then quenched to form a solid section. Thereafter this nonferrous composite layer is sized or machined to a uniform thickness. The exposed surface will then consist of low and high melting point constituents. This strip is then blanked and formed into bearings.

In the drawing:

Figure 1 is an isometric view of a sleeve bearing made in accordance with the present invention.

Figure 2 is a block diagram showing the process of the present invention.

Figure 3 is a sectional view through the strip material of Figure 2, taken along line 3—3 showing the plated steel strip.

Figure 4 is a sectional view taken along line 4—4 showing loose powder on the copper plated strip.

Figure 5 is a sectional view taken along line 5—5 of Figure 2 showing the sintered layer.

Figure 6 is a sectional view taken along 6—6 of Figure 2, showing the babbitt filled sintered layer.

Figure 7:
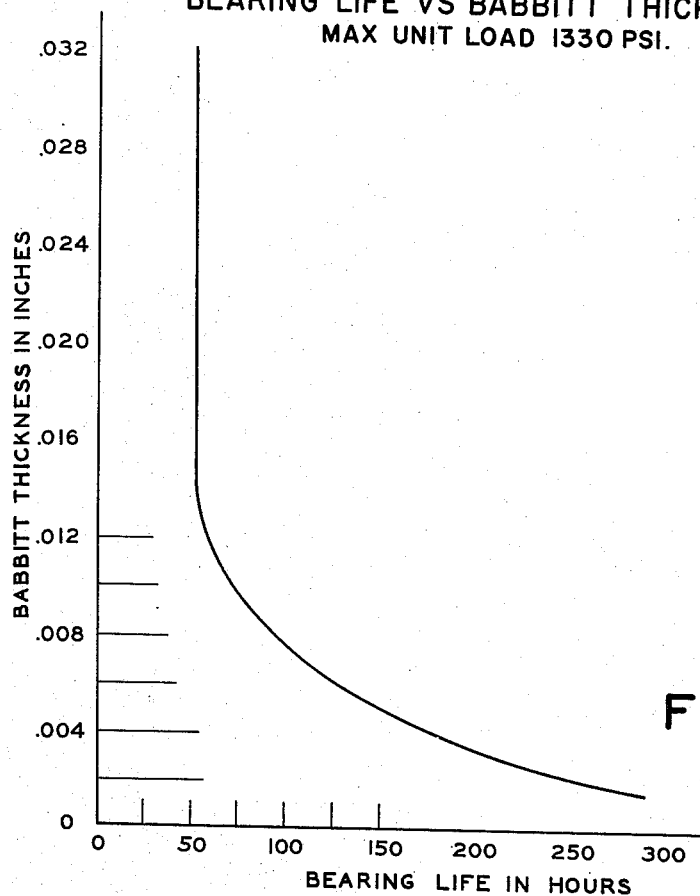
Figure 7 is a graph showing bearing life as a function of babbitt thickness.

The steel strip 10, from which bearings may be made, is continuously passed through suitable cleaning apparatus and then preferably is copper plated on one of its major faces 11. After plating the strip passes under a hopper 12 which uniformly distributes on its plated major face a thin layer of special powder 13. The thin layer of powder is then sintered by passing the strip through a furnace 14 for a sufficient period of time and at a proper temperature and under reducing atmosphere to sinter the particles together and to the top surface of the steel strip, thus forming a self-sustaining sponge 15. The composition of the powder particles, the time and temperature of the sintering and the particles size of the powder are all of importance in arriving at a sponge having a large plurality of very small cavities which interconnect with each other and which adhere to the steel strip with modest tenacity. By suitable means 16 the strip is brought to a temperature of approximately 1000 to 1200° F. which is well above the melting point of the babbitt constituent. Babbitt 17 is cast onto the strip by means 18 and is immediately quenched by means 20. The temperature and time for objectionable reaction between the sintered constituent and the babbitt is held to a minimum. The rapid drop in temperature aids in filling the voids even though the metal surface of the sintered layer is readily wetted by the babbitt. Immediately after casting and while the babbitt on the surface of the sponge is still liquid the surface is wiped clean of all excess babbitt right down to the surface of the sponge, wiper 19 being provided for this purpose. Almost simultaneously with the wiping the underneath surface of the steel strip is quenched by apparatus 20 causing the liquid babbitt to flow into the cavities and to become solid.

The process variables and the materials which are used to form the sponge are chosen to produce a sponge layer which is preferably about .008 to .015" thick, and approximately ⅔ of the volume of this layer is occupied by sintered metal particles while the other ⅓ prior to casting the babbitt is made up of very small cavities. It is of extreme importance that the individual cavities be small since in the finished bearing they are filled with babbitt, and the fatigue life of babbitt is rapidly reduced as the thickness of the babbitt increases in any of the planes.

Throughout the drawings the thickness of the steel strip 10, the thickness of the plating 11, and the thickness of the bearing layer has been greatly exaggerated.

It is relatively easy to sinter large powder particles onto steel strip and to obtain large cavities which can thereafter easily be filled with babbitt. However, to obtain uniform cavities which are substantially all on the order of .001 inch and to thereafter fill all cavities with molten babbitt requires close control of materials and process variables. Generally speaking the smaller the cavities the better the fatigue life of the bearing, but it is also true that the smaller the cavities the harder it is to obtain complete, uniform filling with the molten babbitt.

In order to achieve the close control of the cavity size in the sponge a special powder is used. This powder results in a sponge which is 1 to 2% tin and the balance copper. These proportions are critical to the bearing of this invention, since a greater amount of tin produces a bearing surface which is too hard and causes scoring of the journal.

A sponge of pure copper cannot readily be made on a production line since the melting point of pure copper is quite sharp. To go above this temperature, even slightly, results in low irregular sponge voids and to go below this temperature results in incomplete sintering with consequent poor strength.

It is important that the tin be added to the copper in the form of a copper-tin alloy. To mix 98-99% copper powder with 2 to 1% tin powder and then sinter the mixture results in an unsatisfactory sponge. The proportion of tin is so small that the resulting "sponge" is made up of large areas of predominantly pure copper, with poor sponge characteristics, and smaller areas of hard bronze which will score journal materials.

In order to evenly distribute the 1-2% tin throughout the copper it is important that at least a significant portion of the powder which is spread on the copper plated steel strip be pre-alloyed. Thus to form a 99% copper, 1% tin sponge it has been found satisfactory to use 90% pure copper powder mixed with 10% copper-tin alloy powder, the copper-tin alloy being 90% copper and 10% tin.

To form a 98% copper, 2% tin sponge it has been found satisfactory to use 80% pure copper powder mixed with 20% copper-tin alloy powder, the copper-tin alloy being 90% copper and 10% tin.

It is, of course, within the scope of the invention to use other proportions of pure copper powder to copper-tin alloy powder, to the extent that 100% pre-alloyed powder may be used, and it follows that 90/10 copper-tin is not the only alloy which may be used. For example, the alloy may be between 85/15 and 95/5 copper-tin, and a sufficient quantity be added to the pure copper powder to result in a sponge which has 1 to 2% tin content. The least significant quantity of alloy powder which will achieve the desired result is that which will result in 1% tin in the sponge, and will give a good uniform sintered sponge without tin rich and tin poor areas.

The addition of at least a significant proportion of copper-tin alloy bronze powder to the pure copper powder results in a broader satisfactory temperature range for sintering and makes a high speed process practical for a production line since high temperatures can be utilized for short time intervals for economical reasons and without objectionable reaction.

In addition to the composition, the particle size of the powder and the sintering time and temperature are important in obtaining a uniform, reproducible, fine cavity sponge layer on the steel strip.

All of the powder particles of copper must be sufficiently small that they will pass through a 150 mesh screen, and it is desirable that approximately 50% of the particles pass a 325 mesh screen. The bronze particles must pass a 100 mesh screen.

After the powder to be sintered has been uniformly spread to a depth of between .012" and .023" on the top surface of the moving steel strip the powder is sintered in place without compacting at a temperature between 1830° F. and 1900° F. for a time at that temperature of between ½ and 2 minutes. The sintering time and temperature are correlated with the tin content to obtain uniformly small cavities in the sponge. It has been found that the higher the tin content, up to about 2%, and the higher the temperature the less porous the sponge. The powder layer is reduced in thickness by the sintering process, and upon cooling would be found to be between .008" and .015".

Measurements made on a sintered layer having a nominal composition of 2% tin and 98% copper and made in accordance with the above process show that 37-39% of the volume of the layer is cavity and 61-63% is solid. Of the total volume of the layer:

Less than 2% is made up of the voids which are greater than 100 microns across.

3 to 3.5% is made up of voids which range between 50 and 100 microns across.

8 to 9% is made up of voids which are between 35 and 50 microns across.

21 to 23% is made up of voids which are between 20 and 35 microns across.

1.5 to 2.0% is made up of voids which are between 15 and 20 microns across.

Less than 1.5% is made up of voids which are below 15 microns across.

It is to be noted that the percentage of the volume of the sintered layer which is made up of cavities less than 15 microns is very small, which is highly desirable because the extremely small cavities are difficult to fill with babbitt. It is also to be noted that of the volume of the sintered layer only about 5% is made up of cavities larger than 50 microns. This too is advantageous since large particles of babbitt fatigue more readily than small particles and tear away from the sponge. Cavities on the order of .001 inch (25.4 microns) to .002 inch occupy 30% of the entire volume of the sponge layer. These cavities can be readily filled with babbitt by the process of this invention and are sufficiently small that the fatigue life of a bearing made from this material is excellent.

After the sponge has been sintered onto the surface of the steel strip the composite strip is cooled down to a temperature of 1000 to 1200° F. and it moves under a babbitt casting box where molten babbitt at 700 to 750° F. is cast onto the sintered surfaces thereof.

The composition of the babbitt is not critical, it being found that 85% to 92% lead, balance tin, is an excellent composition.

It is important, however, to have the strip hotter than the molten babbitt at the location where the molten babbitt engages the sintered surface of the strip, and it is important to quench the underneath side of the strip immediately beyond that location. It is also important to wipe the molten babbitt from the surface of the composite strip while it is still in a molten state. Accordingly, immediately after the babbitt casting box there is provided a wiper, or squeezer, which wipes off the excess babbitt right down to the top surface of the sintered sponge layer, thereby facilitating the penetration of all of the small cavities by the molten babbitt. Simultaneously with the wiping action but before the molten babbitt hardens the underneath surface of the strip is quenched causing partial vacuum to be formed in the cavities which pulls the molten babbitt into the innermost spaces.

It is very important due to the extremely small particle size that the molten babbitt be cooled as quickly as possible after it is made to penetrate the extremely small cavities. This is because hard, abrasive alloys are formed when hot babbitt and hot copper-tin sponge are maintained in contact with each other for too long a period of time. These abrasive alloys, if formed, would engage the journal and score it. However, the steel strip must be hotter than the molten babbitt to facilitate filling the extremely small cavities. Accordingly, it is highly advisable that during casting the sintered strip be maintained between 1000 and 1200° F., that the babbitt be about 700 to 750° F., and just as soon as the wiping action is completed that the strip be quickly quenched to reduce to a minimum the formation of the abrasive alloys.

The strip after the sintering and infiltrating steps of the continuous process is then cut to size, the bearing formed, and the bearing surface is then machined to size by the removal of about .005 inch from the bearing surface, resulting in a sleeve bearing whose bearing layer preferably is between .003 inch and .010 inch in thickness, and resulting in a minimum of waste of expensive bearing materials.

Figure 8:
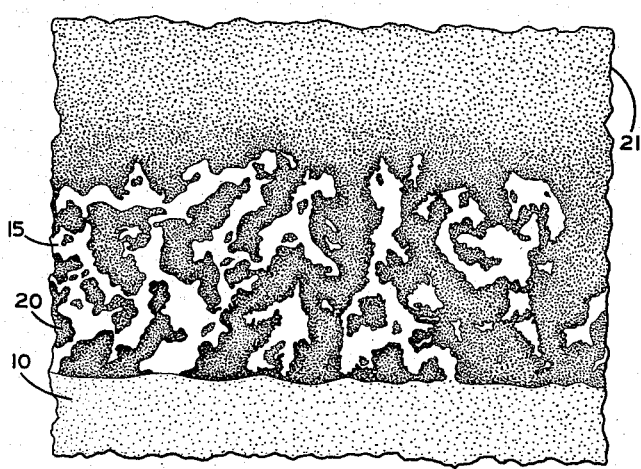
Figure 8 is a photo-micrograph of a section through a bearing made in accordance with the present invention, with a magnification of 100 diameters.

Figure 8 is a photo-micrograph of a bearing blank, magnified one hundred times, showing the steel strip 10, the self-sustaining sintered sponge layer 15, and babbitt particles 20 in the pores of the sponge 15. Also shown is a layer of babbitt 21 which will be machined off to form the bearing from the bearing blank.

While there have been described what are at present considered to be the preferred embodiments of this invention, it will be obvious to those skilled in the art that various changes may be made therein without departing from the invention, and it is, therefore, aimed in the appended claims to cover all such changes and modifications as fall within the true spirit and scope of the invention.

What is claimed is:

1. The method of making a strip of bearing material comprising the steps of providing a strip of metal; spreading on one face of said strip a layer of mixed powdered metal comprising at least in part copper-tin alloy of a particle size such that all particles pass 100 mesh and copper of a particle size such that all particles pass 150 mesh and approximately 50% pass 325 meshing, sintering said layer of powdered metal onto said strip of metal to form a sponge layer thereon having about ⅔ of its volume formed of metal and the other ⅓ formed of cavities with the cavities being predominantly on the order of about .001″ to .002″, the amount of tin in said copper-tin alloy being such that said sintered layer is an alloy having about 1 to 2% tin, bringing said strip and said sintered layer to a temperature above 1000° F.; casting babbitt in a reducing atmosphere at a temperature about 700° F. onto said sintered layer to cause the molten babbitt to penetrate said thin sintered layer and contact said strip of metal; cooling said composite strip whereby said babbitt hardens to tenaciously adhere said sintered layer to said strip; and machining said cast and sintered layers to expose part of said sintered material and to reduce the total thickness of said sintered and cast bearing layers.

2. The method of making a strip of bearing material as set forth in claim 1, further characterized by quenching said composite strip from underneath after said molten babbitt has been applied to the surface to cause a partial vacuum to be established in said cavities tending to pull said molten babbitt into said small cavities.

3. The method of making a strip of bearing material as set forth in claim 1, further characterized by wiping said composite strip immediately after casting molten babbitt thereon to remove all excess babbitt and to substantially expose the top surface of said sintered sponge, and immediately after wiping quenching the opposite side of said strip.

4. The method of making a strip of bearing material comprising the steps of: providing a strip of metal applying to the top face of said strip of metal a layer of powdered metal comprising a uniform mixture of copper particles and copper-tin bronze particles of a particle size such that all of the copper and copper-tin bronze particles pass through a 100 mesh screen and approximately 50% of the copper particles pass through a 325 mesh screen, heating said strip with said powder thereon to a temperature of about 1830 to 1900° F. for about one-half minute to two minutes to cause said powder to be sintered onto said strip to form a composite strip with a sponge layer thereon having about ⅔ of its volume formed of interlocked sintered-together metal particles and about ⅓ of its volume formed of interconnecting cavities with substantially all said cavities being .001″ to .002″, the amount of tin in said copper-tin bronze powder being such that the said sponge layer is an alloy of about 1–2% tin and the balance substantially all copper; cooling said composite strip with said sintered sponge thereon to a temperature above about 1000° F.; applying to the composite strip molten babbitt at a temperature about 700° F. in a reducing atmosphere to cause said babbitt to penetrate into said cavities and contact said strip of metal; wiping excess molten babbitt off of the surface of said composite strip to expose said sponge layer, and cooling strip rapidly from below to cause a partial vacuum to be established in said cavities tending to pull said molten babbitt into said small cavities, cooling said strip, and removing a thin layer of babbitt and sponge to form a composite bearing surface of babbitt and sponge.

References Cited in the file of this patent

UNITED STATES PATENTS

| | | |
|---|---|---|
| 2,198,240 | Boegehold | Apr. 23, 1940 |
| 2,198,253 | Koehring | Apr. 23, 1940 |
| 2,260,247 | Darby | Oct. 21, 1941 |
| 2,372,202 | Hensel | Mar. 27, 1945 |
| 2,490,543 | Robertson | Dec. 6, 1949 |
| 2,585,430 | Boegehold | Feb. 12, 1952 |
| 2,801,462 | Wagner | Aug. 6, 1957 |